(12) United States Patent
Feldman

(10) Patent No.: US 6,763,600 B2
(45) Date of Patent: Jul. 20, 2004

(54) APPARATUS FOR ORIENTING EYEGLASSES FOR SCANNING BY ELECTRONIC SCANNER

(75) Inventor: Zvi Feldman, Zoran (IL)

(73) Assignee: Opti-Clip International LLC, Boca Raton, FL (US)

( * ) Notice: Subject to any disclaimer, the term of this patent is extended or adjusted under 35 U.S.C. 154(b) by 275 days.

(21) Appl. No.: 09/991,867

(22) Filed: Nov. 26, 2001

(65) Prior Publication Data

US 2003/0099521 A1 May 29, 2003

(51) Int. Cl.$^7$ ................................................. G01B 1/00
(52) U.S. Cl. ......................... 33/507; 33/200; 409/220; 409/225
(58) Field of Search ................. 33/507, 28, 286, 33/200, 533, 645; 409/94, 219, 220, 225

(56) References Cited

U.S. PATENT DOCUMENTS

| | | | |
|---|---|---|---|
| 3,981,081 A | * | 9/1976 | Welch ........................ 33/507 |
| 4,299,032 A | * | 11/1981 | Young ........................ 33/507 |
| 4,920,700 A | | 5/1990 | Murahashi et al. |
| 5,123,724 A | | 6/1992 | Salk |
| 5,347,762 A | | 9/1994 | Shibata et al. |
| 5,428,448 A | | 6/1995 | Albert-Garcia |
| 5,454,050 A | | 9/1995 | Nakabayashi et al. |
| 5,501,017 A | * | 3/1996 | Suzuki ........................ 33/200 |
| 5,530,652 A | | 6/1996 | Croyle et al. |
| 5,546,140 A | | 8/1996 | Underwood |
| 5,754,272 A | * | 5/1998 | Dimalanta ................ 33/507 |
| 5,774,200 A | | 6/1998 | Markey |
| 5,809,179 A | | 9/1998 | Marimont et al. |
| 5,838,417 A | | 11/1998 | Dahan et al. |
| 5,910,854 A | | 6/1999 | Varaprasad et al. |
| 5,940,538 A | | 8/1999 | Spiegel et al. |
| 5,974,169 A | | 10/1999 | Bachelder |
| 6,006,592 A | * | 12/1999 | Suzuki et al. ................ 33/507 |
| 6,087,617 A | | 7/2000 | Troitski et al. |
| 6,122,063 A | | 9/2000 | Berndt et al. |
| 6,170,321 B1 | * | 1/2001 | Suzuki et al. ................ 33/507 |
| 6,178,264 B1 | | 1/2001 | Kamatani |
| 6,243,960 B1 | | 6/2001 | Andrews et al. |
| 6,249,991 B1 | | 6/2001 | Rarick et al. |

FOREIGN PATENT DOCUMENTS

| | | |
|---|---|---|
| DE | 196 16 526 A1 | 11/1997 |
| DE | 197 25 159 C1 | 7/1998 |
| DE | 19738668 | 3/1999 |
| EP | 0 839 603 A1 | 5/1998 |
| FR | 2 763 707 | 5/1997 |
| GB | 2 271 631 A | 4/1994 |
| WO | WO 93/24856 | 12/1993 |
| WO | WO 95/04634 | 2/1995 |
| WO | WO 01/53038 A1 | 7/2001 |

OTHER PUBLICATIONS

Jae S. Lim, "Two–Dimensional Signal and Image Processing"; pp. 5–7 (Prentice Hall 1990).

J. R. Parker, "Algorithms for Image Processing and Computer Vision", pp. 23–29 (John Wiley & Sons, Inc.).

John Canny, "A Computational Approach to Edge Detection", pp. 679–698, IEEE Transactions on Pattern Analysis and Machine Intelligence, vol. PAM 1–8, No. 6; Nov. 1986.

* cited by examiner

*Primary Examiner*—Christopher W. Fulton
(74) *Attorney, Agent, or Firm*—Morgan, Lewis & Bockius LLP

(57) ABSTRACT

Apparatus for orienting a pair of framed eyeglasses relative to an electronic scanner whereby the scanner then generated digital data defining the geometry of the frame. This data is entered into a computer to cause it to control a milling machine which shapes a blank to form a filter lens for an accessory that clips onto the frame and has a matching geometry.

10 Claims, 2 Drawing Sheets

US 6,763,600 B2

APPARATUS FOR ORIENTING EYEGLASSES FOR SCANNING BY ELECTRONIC SCANNER

BACKGROUND OF THE INVENTION

1. Field of the Invention

This invention relates to the control by a computer of a milling machine which shapes a blank to form a filter lens for a clip-on accessory to be hitched onto the frame of a pair of eyeglasses whereby the geometry of the filter lens matches the geometry of the half-section of the frame onto which it is clipped.

More particularly, the invention resides in apparatus adapted to orient these eyeglasses with respect to an electronic scanner so that it generates digital data defining the geometry of a half-section of the frame of the eyeglasses, the data being entered into a computer so that it can control the milling machine which impart a matching geometry to the filter lens

2. Status of Prior Art

In our copending application whose entire disclosure is incorporated herein by reference, entitled "Computer Controlled Milling Machine for Producing Lenses for Clip-On Accessory" (SN 136509.7) there is disclosed a milling machine for shaping blanks to create filter lenses for a clip-on accessory having a pair of filter lenses which register with a pair of optical lenses in prescription eyeglasses when the accessory is hitched onto the frame of the eyeglasses. The frame of the eyeglasses is composed of two like half-sections having a predetermined geometry, an optical lens being mounted in each half-section. The filter lenses in the accessory which are joined by a bridge piece have a geometry matching that of the corresponding half-sections of the fame whereby the appearance of the clip-on accessory is fully compatible with that of the eyeglasses.

In this milling machine, the blank to be milled is supported on a rotary worktable and is engaged by a drilling bit that is shifted along X and Y coordinates to cut the blank to form a filter lens having the desired geometry. In the milling machine, the rotary motion of the worktable on which the blank is supported and the movements of the drill bit which act to shape the blank are computer-controlled to impart the desired geometry to the blank.

The blank workpiece on the worktable is engaged by the bit of a drill bit unit mounted on an elevator. The elevator which acts to move the drill bit up and down along a vertical axis, rides on a carriage movable along a horizontal track back and forth to shift the drill bit along a horizontal axis.

The rotary worktable, the elevator and the carriage are driven by respective stepping motors whose incremental advances are controlled by a computer. Digitally stored in the database of the computer is data regarding the geometry of the half-sections of the eyeglass frame on which the accessory is to be hitched. The computer acts to precisely position the drill bit with respect to the blank as it is being rotated, so as to impart thereto the desired geometry.

In order to instruct the computer how to control the milling machine to impart to the filter lens being shaped, a geometry which matches the geometry of the half-section of the eyeglasses frame onto which this lens is to be clipped, the computer must be supplied with digital data that defines this geometry. To this end, the half-sections of the frame of the eyeglasses are scanned by an electronic scanner which generates digital data regarding the frame geometry and supplies this data to the database.

The concern of the present invention is with the physical orientation of the pair of eyeglasses being scanned relative to the scanner so that the digital data generated by the scanner can be processed in the computer to define with a reasonable degree of accuracy the geometry of the frame of the eyeglasses.

SUMMARY OF THE INVENTION

In view of the foregoing, the main object of this invention is to provide an apparatus which facilitates scanning by a scanner of a pair of eyeglasses so as to translate the geometry of the frame of these glasses into digital data, the apparatus serving to properly orient the eyeglasses with respect to the scanner.

More particularly, an object of this invention is to provide an apparatus for orienting the glasses with respect to the scanner, which apparatus is constituted by an anchor, a pedestal and a fixture, the anchor being bonded to the window of a scanner unit, the pedestal being attached adhesively to a lens of the eyeglasses and being socketed in the anchor so that a lens of the eyeglasses is seen by the scanner, the fixture facilitating attachment of the pedestal to this lens.

A significant advantage of an apparatus in accordance with the invention is that it is not necessary that the eyeglasses whose geometry is to be copied be precisely oriented with respect to the optical axis of the scanner. Should the orientation be off center, the resultant digital data will not accurately reflect the frame geometry. However, by means of appropriate software associated with the computer into which the digital data from the scanner is entered, the data can be corrected to compensate for this deviation.

Briefly stated, an apparatus in accordance with the invention, when used to orient a pair of eyeglasses with respect to an electronic scanner unit having a window and a scanner optically trained on the window, includes an anchor that is bonded to the window at a site in line with the optical axis of the scanner.

Also provided are a pedestal and a fixture to facilitate adhesively attaching the pedestal to a lens of the eyeglasses. The pedestal, when attached to the lens, is then socketed in the anchor so that the half-section of the frame in which this lens is mounted can then be viewed and scanned by the scanner.

The scanner viewing the anchored eyeglasses generates digital data which defines the geometry of the half-section of the frame of the eyeglasses in which the attached lens is mounted. This data is entered into a computer controlling a milling machine which shapes a blank to form a filter lens for a clip-on accessory whose geometry matches that of the frame half-section.

BRIEF DESCRIPTION OF THE DRAWINGS

For a better understanding of the invention as well as other objects and features thereof, reference is made to the annexed drawings wherein.

DETAILED DESCRIPTION OF THE INVENTION

Figure 1:
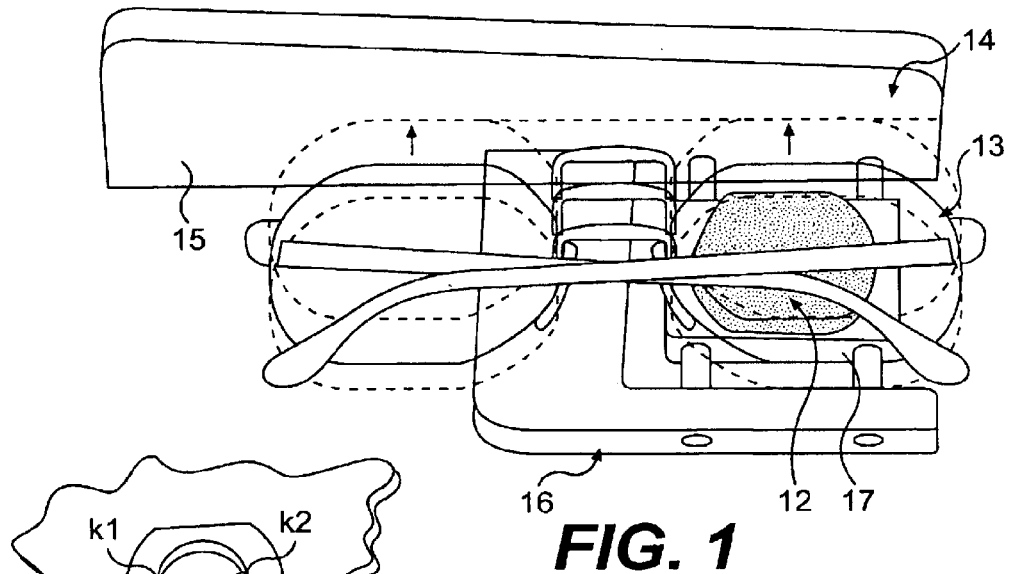
FIG. 1 is a perspective view of a pair of eyeglasses mounted on a fixture included in apparatus in accordance with the invention.
Figure 2:
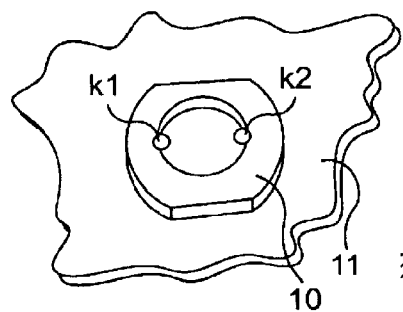
FIG. 2 shows an anchor included in the apparatus in accordance with the invention bonded to the window of a scanner unit.
Figure 3:
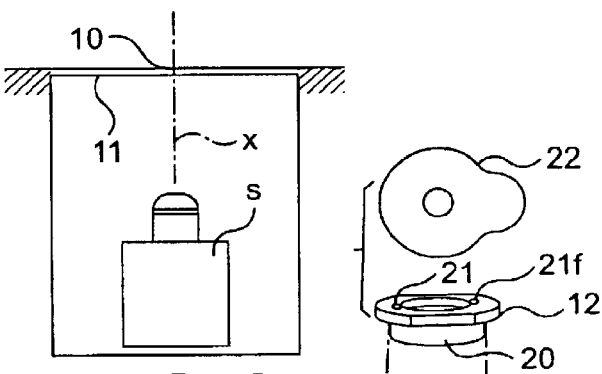
FIG. 3 illustrates the scanner unit.
Figure 4:
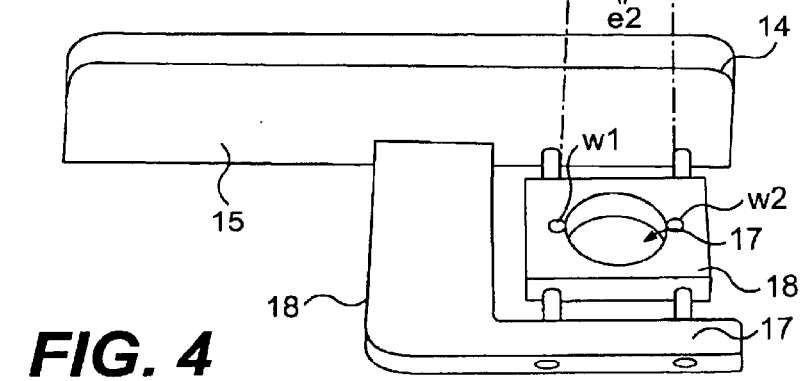
FIG. 4 shows a pedestal included in apparatus in accordance with the invention placed in the fixture so that it can be attached to a lens of the eyeglasses.

The Apparatus. As illustrated in FIGS. 1 to 4, an apparatus in accordance with the invention which serves to orient eyeglasses with respect to an electronic scanner is composed of the following components:

1) An anchor 10 functioning as a socket that is to be bonded to the window 11 of a scanner unit having a scanner S behind the window at a fixed distance therefrom that depends on the focal length of the scanner.

2) A miniature pedestal 12 attachable to a lens L mounted in a half-section of the frame of a pair of eyeglasses 13 in which a pair of optical lenses are mounted in respective half-sections of a frame having a predetermined geometry.

3) A fixture 14 adapted to facilitate the attachment of pedestal 12 to lens L of the eyeglasses whereby the attached pedestal can then be socketed in anchor 10 so that the lens is held at a stable position on window 11 at which it can be seen and scanned by scanner S.

Anchor 10 is ring shaped so that it acts as a socket to receive pedestal 12. This circular socket is provided at diametrically opposed positions with tiny magnetic elements k1 and k2. Pedestal 12 has a cylindrical base 20 above which is a head 21 of greater diameter having a concave face to provide a seat for a convex lens L of the eyeglasses to be attached to the pedestal.

Fixture 14 includes an upstanding rear plate 15 and an L-shaped ledge 16 projecting at right angles from plate 15 and having an arm 17 parallel to the plate. Bridging arm 17 and plate 15 is a miniature square table 18 having a circular opening therein to create a socket 19 in which is receivable base 20 of pedestal 12, the head 21 of the pedestal then resting on the surface of the table.

Seated in wells W1 and W2 at diametrically opposed positions on circular socket 19 of table are tiny magnetic elements e1 and e2. Seated at corresponding positions in the underside of head 21 of pedestal 12 are tiny magnetic elements M1 and M2 of opposite polarity. Hence when the pedestal 12 is inserted in socket 19, the magnetic attraction between elements e1, e2 and M1, M2 holds the pedestal in place on the fixture.

When pedestal 12 is attached to lens L of the eyeglasses and is received in the socket of anchor 10 bonded to the window 11 of the scanner unit, then a half-section of the frame of the eyeglasses is viewable by the scanner.

When pedestal 12 is socketed in table 18 of the fixture, the base 20 of the pedestal is received within socket 19 and the head 21 rests on the surface of the table to expose its concave face 21F. In order now to attach pedestal 12 to lens L of the eyeglasses, adhered to the concave face 21F of the pedestal head is a double-faced sticker 22, each face of which is coated with a layer of pressure-sensitive adhesive.

Hence when lens L is pressed onto the head 21 of the pedestal, it adheres thereto. The strength of pressure-sensitive adhesion between the head of the pedestal and lens L is greater than the strength of the magnetic attraction between the head and the table. Accordingly, when the eyeglasses are pulled off the fixture, the pedestal remains attached to lens L.

The eyeglasses are then transferred to anchor 10 bonded to window 11 of the scanner unit and now the magnetic elements M1 and M2 of the pedestal are attracted to magnetic elements k1 and k2 of the anchor so that the eyeglasses overlie the window at a stable position in which the lens L in a half-section of the frame is at an anchor site in line with the optical axis of the scanner.

It is possible to manually adhere a miniature pedestal to a lens L of a pair of eyeglasses so that the lens can then be anchored on the window of the scanner unit. But this manual operation is difficult to carry out. The advantage of the fixture for this purpose is that the fixture can be rested on a worktable so that the pedestal socketed in the fixture is then at a steady upright position, thereby making it easy to adhere the sticker to its concave head to conform thereto, and to then press the convex lens against the face of the sticker so that the pedestal is now attached to the lens.

The Scanner: The function of the scanner is to view and scan a half-section of the frame of a pair of eyeglasses in which an optical lens is mounted to generate digital data defining the geometry of the half-section. This data is entered into the database of a computer which controls a milling machine so that the blank being milled is shaped to create a filter lens for a clip-on accessory whose geometry matches that of the half-section of the frame. In the eyeglasses shown in FIG. 1 the half-sections of the frame have an octagonal geometry and the digital data yielded by the scanner must define the same geometry.

When the prescription eyeglasses having a pair of optical lenses is "rimless" and therefore has no separate frame, the clip-on accessory having a pair of filter lenses hitches onto the borders of the optical lenses. These borders effectively function as the fame of the eyeglasses, and the geometry of these framing borders must be matched by the filter lenses of the accessory.

It is to be understood that the geometry illustrated is by way of example only, and that whatever the geometry of the frame of the eyeglasses for which a clip-on accessory is to be manufactured, and however, complex this geometry, the scanner arrangement must be such as to provide digital data which reflects this geometry or can be corrected in the computer into which the data is entered to more accurately reflect this geometry.

Figure 5:
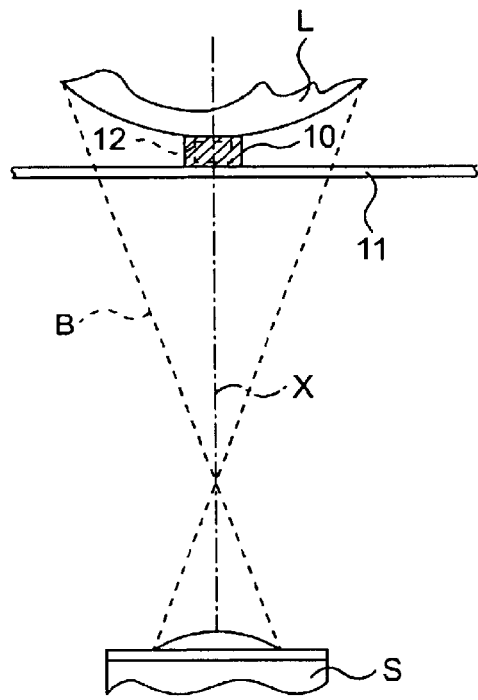
FIG. 5 shows the relationship between a lens of the glasses having a pedestal attached thereto socketed in the anchor bonded to the window when the pedestal is attached to the center of the lens.

A preferred form of scanner unit is an office desk top scanner in which window 11 is flush with the desktop and scanner S is within the desk below the window. It is necessary to so orient the eyeglasses anchored on window 11 of the scanner, that as shown in FIG. 5, pedestal 12 is attached to lens L of the eyeglasses at its center and pedestal 12 is socketed in an anchor 10 bonded to window 11 at a site in line with the optical axis X of the scanner S. Lens L will then be symmetrically disposed with respect to the scanning pattern of the scanning beam B which sweeps lens L.

Figure 6:
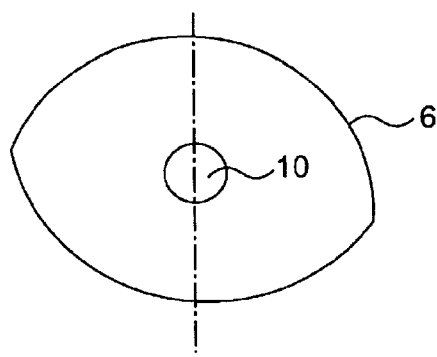
FIG. 6 shows the image of the lens produced by the scanner when the FIG. 4 relationship exists.

When as shown in FIG. 5 lens L is symmetrically disposed with respect to the scanner because its pedestal is attached to the lens center, then the digital image yielded by the scanner as shown in FIG. 6 places pedestal 10 at the center of lens 11.

Figure 7:
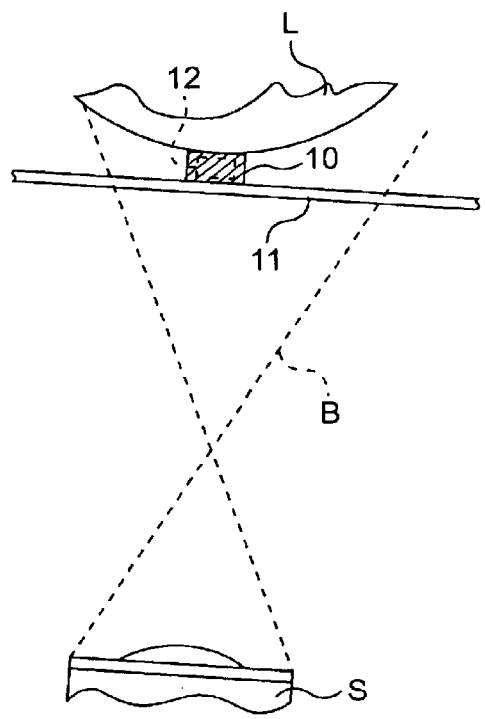
FIG. 7 shows the relationship when the attachment to the lens is off center.

But in practice, when attaching the pedestal to lens L it may, as shown in FIG. 7, be off center. As a consequence of which the scanning pattern is unsymmetrical and the resultant digital data generated by the scanner does not accurately define the frame half-section geometry.

Another variable which disturbs the accuracy of the digital data in defining the frame geometry is the non-planar form of lens L in the eyeglasses. The distance of the scanner to the lens being scanned will depend on the convexity of the lens, each pair of eyeglasses having a somewhat different degree of convexity.

In order therefore to compensate for deviations in the digital data from an exact definition of the geometry of the half-section of the frame of the eyeglasses, the computer is provided with software whose algorithm corrects the data entered into the computer so that it more accurately defines this geometry.

While there has been shown a preferred embodiment of an apparatus in accordance with the invention it is to be understood that many changes may be made therein without departing from the spirit of the invention.

What is claimed is:

1. Apparatus adapted to orient a pair of eyeglasses having an optical lens mounted in each half-section of a frame having a predetermined geometry with respect to an electronic scanner positioned behind a window and trained thereon so that its optical axis passes through a site on the window, the apparatus which acts to orient the half-section so that it can be scanned to generate digital data defining the geometry, comprising:
   A. An anchor bonded to said window at said site and adapted to socket a pedestal;
   B. A miniature pedestal attachable to said lens so that when socketed in said anchor, the half-section of the frame in which the lens is mounted is then viewable by the scanner and in a position to be scanned; and
   C. A fixture provided with a table having a socket to accommodate the pedestal so that it can be adhesively attached to the lens, the lens with the pedestal attached thereto then being transferred to the window where the attachment is then socketed in the anchor.

2. Apparatus as set forth in claim 1, in which the fixture includes a rear plate from which a ledge extends to support a table having a circular hole therein to form a socket to receive the pedestal.

3. Apparatus as set forth in claim 2, in which the pedestal is formed by a cylindrical base which is received in said table socket and a head of greater diameter to which a sticker is attached.

4. Apparatus as set forth in claim 3, in which the sticker is a double-faced pressure sensitive adhesive, the under face of which being adhered to said head, the upper face being adhered to the lens.

5. Apparatus as set forth in claim 3, in which the anchor includes a magnetic element which is attracted to a magnet element in the head of the pedestal whereby when the pedestal is socketed in the anchor it is magnetically held in place.

6. Apparatus as set forth in claim 5, in which the anchor is ring shaped and has a diameter close to diameter of the cylindrical base of the pedestal so that the pedestal fits therein.

7. Apparatus as set forth in claim 3, in which the table includes a magnetic element which is attracted to the magnet element in the head of the magnetic element in the head of the pedestal whereby the pedestal is magnetically held in contact on the table.

8. Apparatus as set forth in claim 1, in which the data generated by the scanner is entered into the database of a computer.

9. Apparatus as set forth in claim 8, in which the computer acts to control a blank to form a filter lens having the geometry dictated by the data in the database.

10. Apparatus as set forth in claim 9, in which the computer includes software to compensate for deviations in the data yielded by the scanner which does not accurately define the geometry.

* * * * *